US010909787B2

(12) United States Patent
Jeruchim et al.

(10) Patent No.: US 10,909,787 B2
(45) Date of Patent: Feb. 2, 2021

(54) SECURE DIGITAL STORAGE DEVICE AND APPLICATION

(71) Applicant: Holdin Industries, LLC, Boston, MA (US)

(72) Inventors: Vivianne E. Jeruchim, Weston, MA (US); Evan M. Dooley, Dorchester, MA (US)

(73) Assignee: Holdin Industries, LLC, Boston, MA (US)

( * ) Notice: Subject to any disclaimer, the term of this patent is extended or adjusted under 35 U.S.C. 154(b) by 0 days.

(21) Appl. No.: 16/287,447

(22) Filed: Feb. 27, 2019

(65) Prior Publication Data

US 2019/0266824 A1    Aug. 29, 2019

Related U.S. Application Data

(60) Provisional application No. 62/635,835, filed on Feb. 27, 2018.

(51) Int. Cl.
| | |
|---|---|
| G07C 9/00 | (2020.01) |
| E05B 47/00 | (2006.01) |
| E05B 65/52 | (2006.01) |
| B65D 81/02 | (2006.01) |
| B65D 25/06 | (2006.01) |
| E05B 51/00 | (2006.01) |
| E05B 17/22 | (2006.01) |

(52) U.S. Cl.
CPC ......... *G07C 9/00563* (2013.01); *B65D 25/06* (2013.01); *B65D 81/022* (2013.01); *E05B 47/0001* (2013.01); *E05B 51/00* (2013.01); *E05B 65/52* (2013.01); *E05B 17/226* (2013.01)

(58) Field of Classification Search
None
See application file for complete search history.

(56) References Cited

U.S. PATENT DOCUMENTS

| 3,754,803 | A | * | 8/1973 | Underwood | ........... B65D 81/07 312/31 |
|---|---|---|---|---|---|
| 6,622,063 | B1 | * | 9/2003 | Moritz | ................... B65D 90/00 700/231 |

(Continued)

OTHER PUBLICATIONS

Vaultek, Introducing the VT10i, Mar. 21, 2017, retrieved Jul. 20, 2017, https://vaulteksafe.com.index.php/2017/03/21/vaultek-introducing-the-vt10i/.

(Continued)

*Primary Examiner* — K. Wong
(74) *Attorney, Agent, or Firm* — Rhodes Donahoe, LLC; Robert V. Donahoe

(57) ABSTRACT

The present invention provides a secure storage, management and delivery device for a composition paired with a digital technology. The storage system includes a digital controller and a storage device having an access panel configured to open and close in order to control access to a cavity of the storage device and an electro-mechanical lock configured to lock and unlock the access panel. The digital controller is configured to wirelessly communicate with the storage device in order to control the electro-mechanical lock. The access panel comprises an environmental control component adapted to minimize an environmental effect when the access panel is closed.

19 Claims, 16 Drawing Sheets

(56) References Cited

U.S. PATENT DOCUMENTS

| | | | | |
|---|---|---|---|---|
| 7,314,341 B2* | 1/2008 | Malin | ............... | B65G 1/045 |
| | | | | 414/331.02 |
| 9,579,245 B2* | 2/2017 | Larkner | ............ | G07F 11/165 |
| 2008/0047282 A1* | 2/2008 | Bodin | ............... | G06Q 10/08 |
| | | | | 62/129 |

OTHER PUBLICATIONS

Vaultek, Introducing the VT10i, Mar. 21, 2017, retrieved Jul. 20, 2017, https://vaulteksafe.com.php/product/vaultek-vt10i/.

Medicus Health, Portable Lock Box with Digital Keypad, retrieved Jul. 20, 2017, https://www.medicus-health.com/Portable-Lock-Box-with-Digital-Keypad.aspx?gclid=EAI.

Medicus Health, Dual Biometric Secure Storage Device, retrieved Jul. 20, 2017, https://www.medicus-health.com/Portable-Lock-Box-with-Digital-Keypad-2.aspx?gclid=Cj.

Amazon.com, Vaultz Locking Medical Storage Box, 3.75 × 11.88 × 5.25 inches, Black (VZ03480), retrieved Jul. 20, 2017, https://www.amazon.com/Vaultz-Locking-Medicine-Storage-VZ03480/dp/B0171E8AE0/r.

* cited by examiner

SECURE DIGITAL STORAGE DEVICE AND APPLICATION

STATEMENT REGARDING FEDERALLY SPONSORED RESEARCH OR DEVELOPMENT

N/A

BACKGROUND OF THE INVENTION

Various embodiments relate generally to storage systems, methods, devices and computer programs and, more specifically, relate to secure storage systems for regulated products.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

There is a need for safe and secure options for storage and management of products such as pharmaceutical or other regulated products.

BRIEF SUMMARY OF THE INVENTION

The below summary is merely representative and non-limiting.

In a first aspect, an embodiment provides a secure storage, management and delivery device for a composition paired with a digital technology. The storage system includes a digital controller and a storage device having an access panel configured to open and close in order to control access to a cavity of the storage device and an electro-mechanical lock configured to lock and unlock the access panel. The digital controller is configured to wirelessly communicate with the storage device in order to control the electro-mechanical lock. The storage device may also include various components such as, geo-tracking components, an RFID, an interior camera, and other special purpose chips. The access panel comprises an environmental control component that may include, but is not limited to, shock absorption, humidity control, and odor control, adapted to minimize an environmental effect when the access panel is closed.

BRIEF DESCRIPTION OF THE SEVERAL VIEWS OF THE DRAWINGS

Aspects of the described embodiments are more evident in the following description, when read in conjunction with the attached Figures.

DETAILED DESCRIPTION OF THE INVENTION

Figure 1:
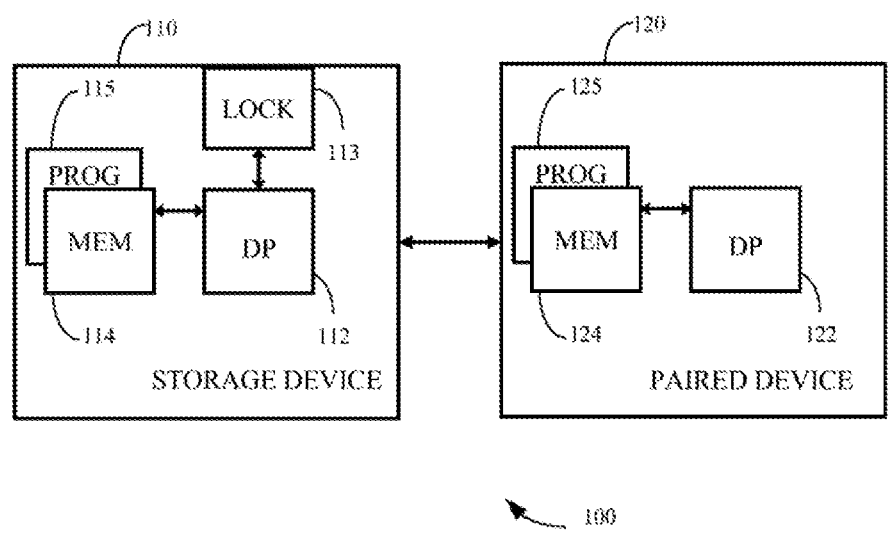
FIG. 1 illustrates devices according to one embodiment.
Figure 2:
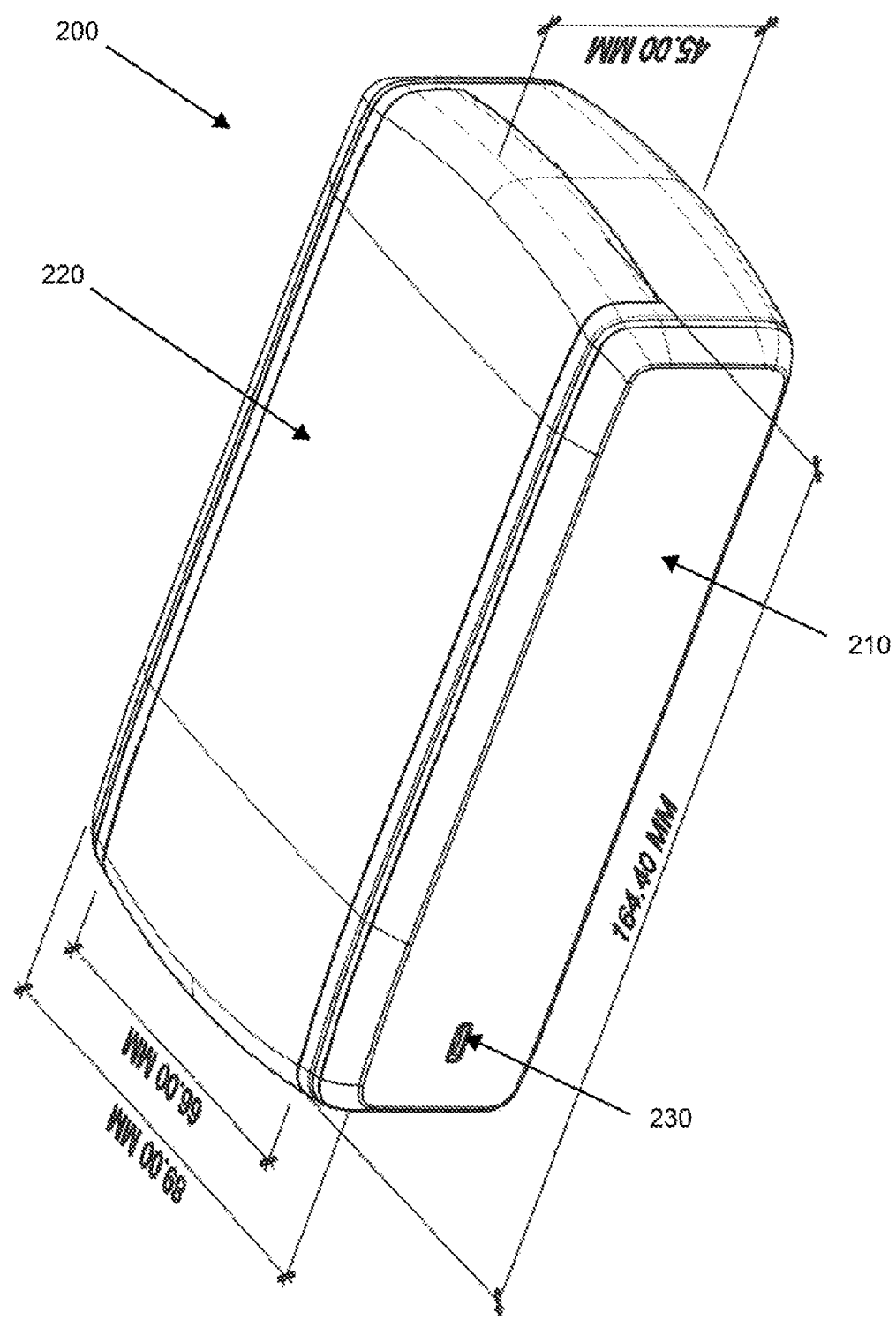
FIG. 2 shows a device according to another embodiment.
Figure 3:
FIG. 3 shows the device of FIG. 2.
Figure 4:
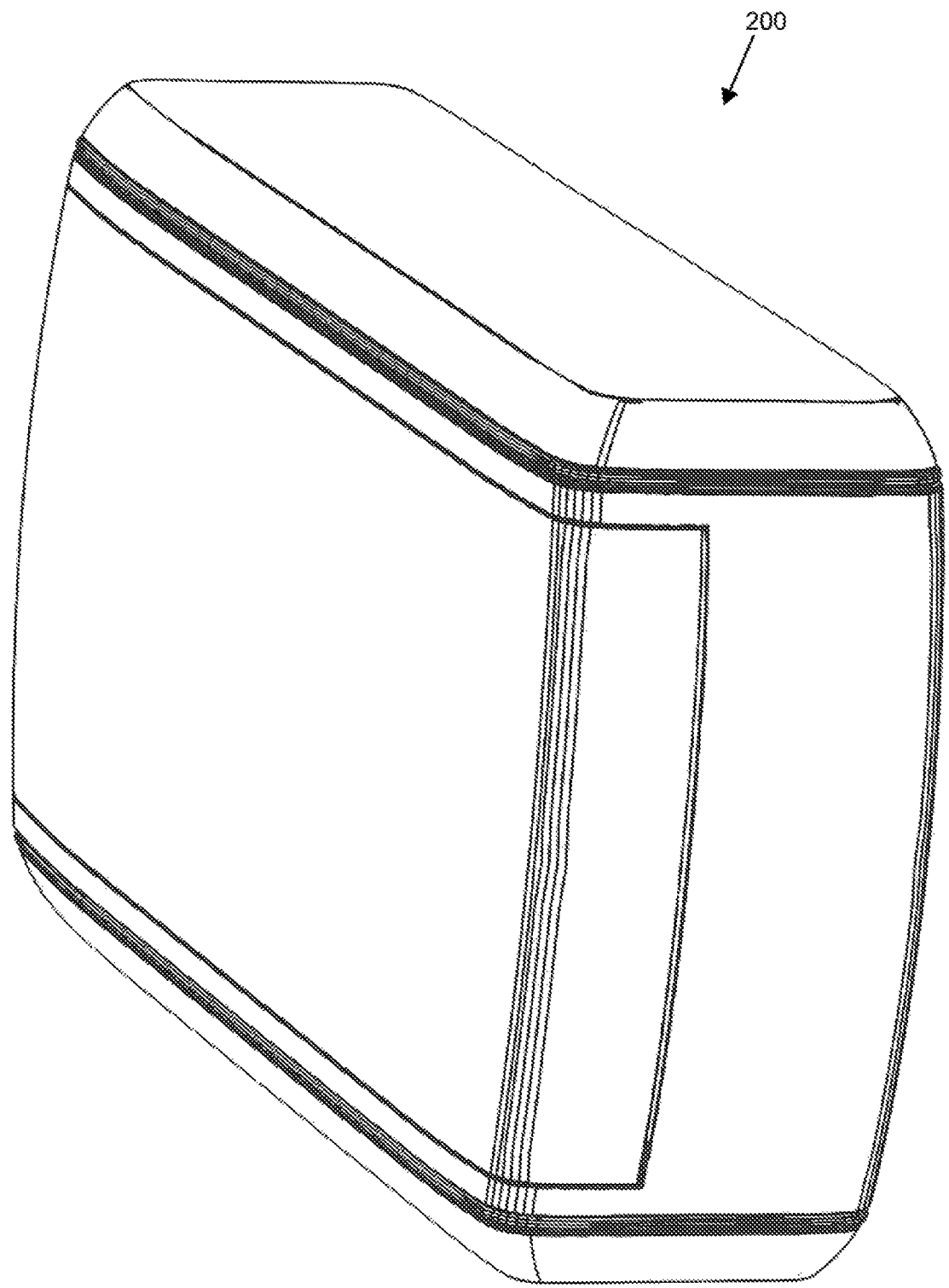
FIG. 4 shows the device of FIG. 2.
Figure 5:
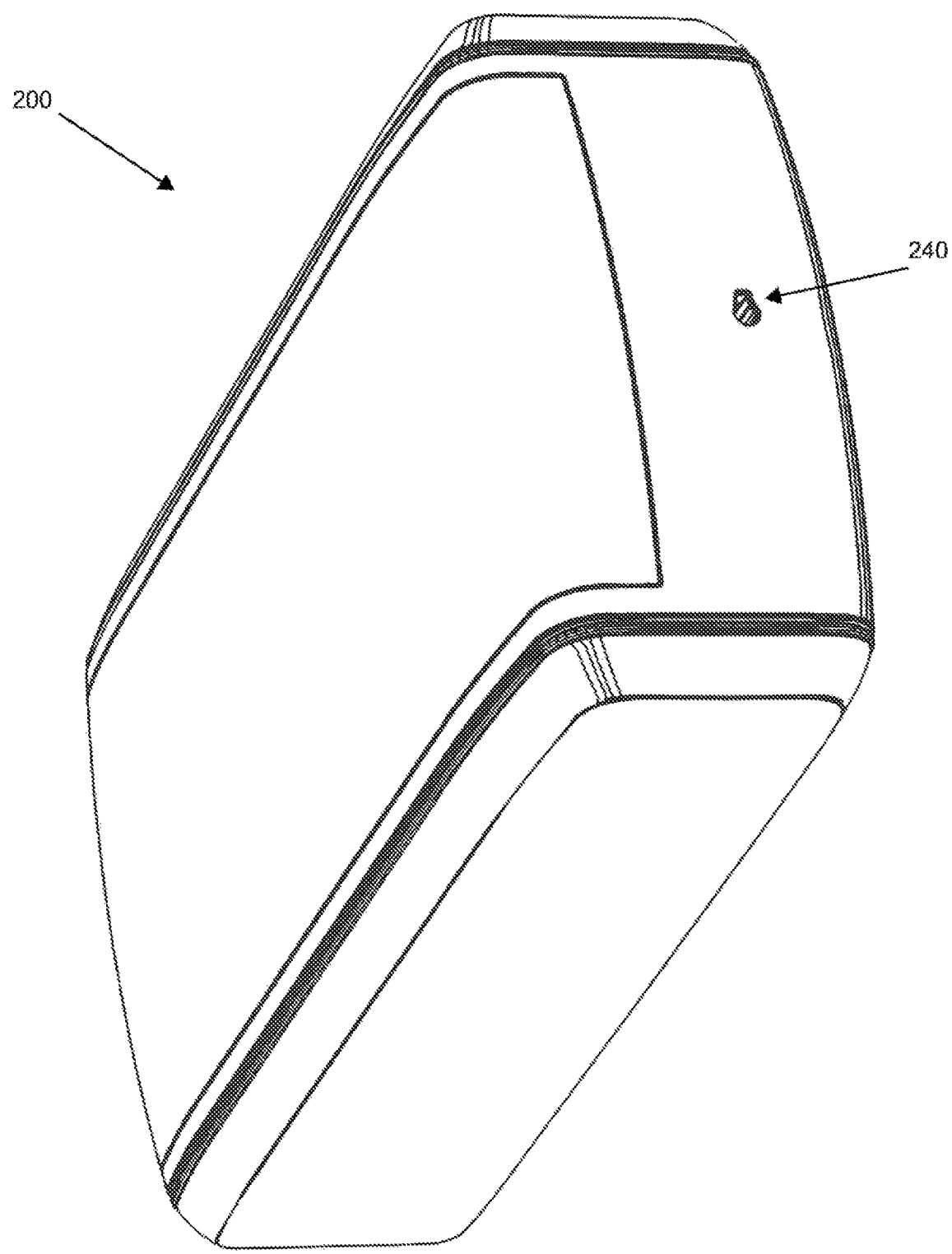
FIG. 5 shows the device of FIG. 2.
Figure 6:
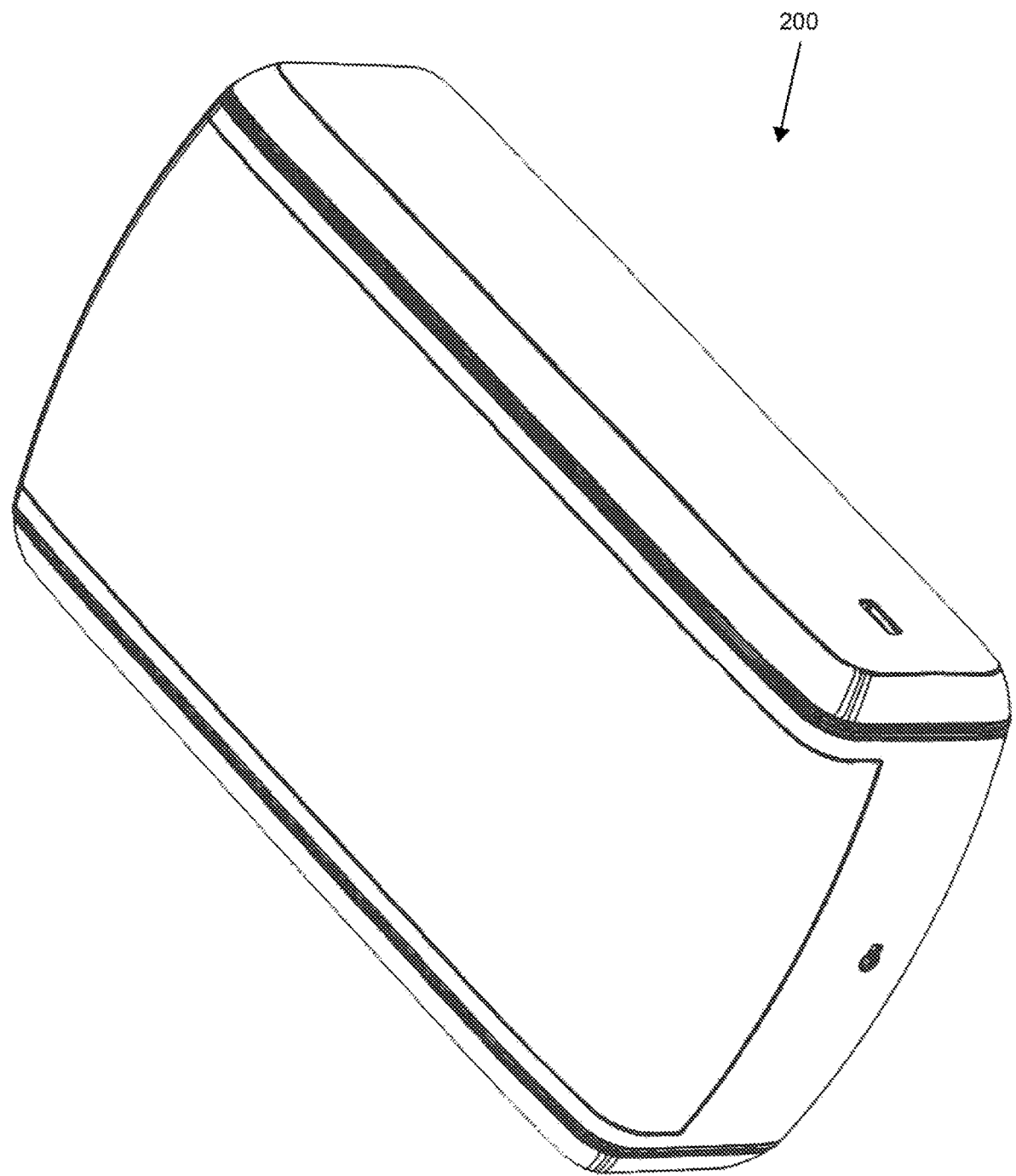
FIG. 6 shows the device of FIG. 2.
Figure 7:
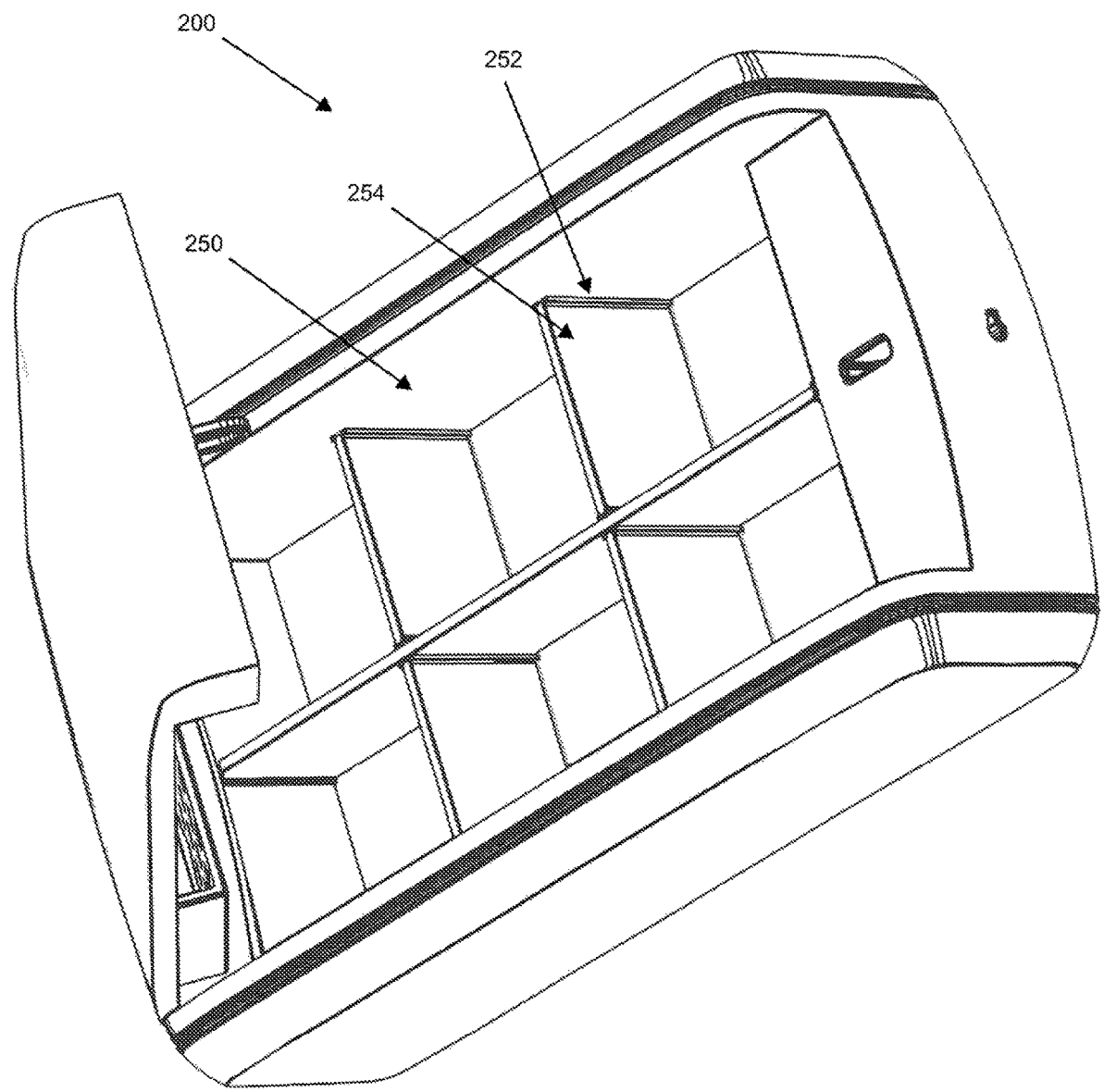
FIG. 7 shows the device of FIG. 2.
Figure 8:
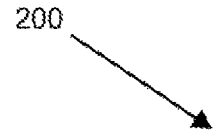
FIG. 8 shows the device of FIG. 2.
Figure 8:
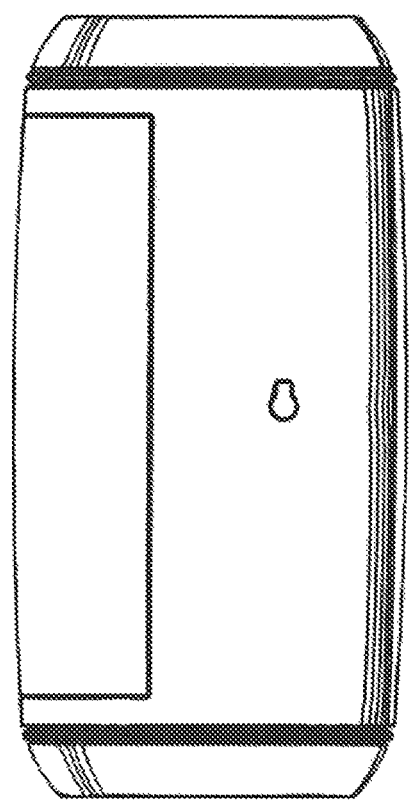
Figure 9:
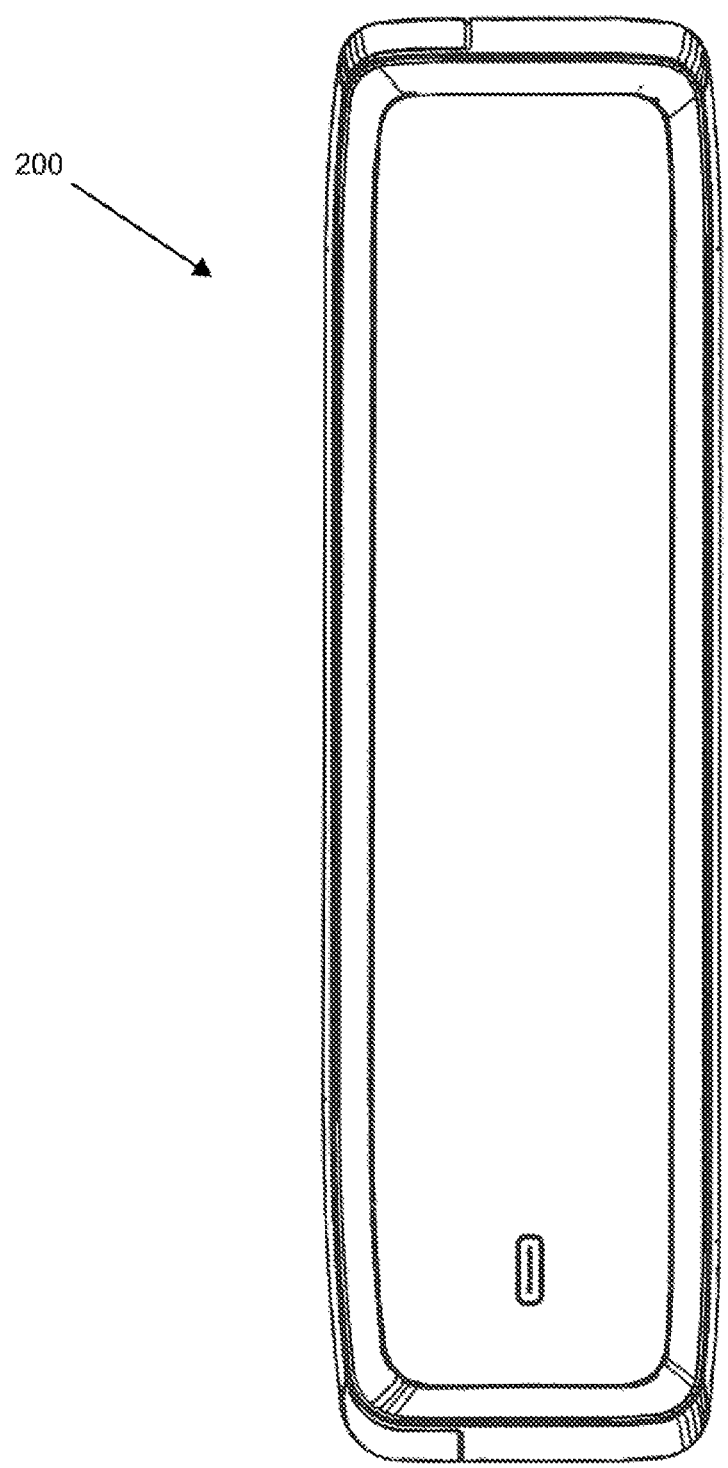
FIG. 9 shows the device of FIG. 2.
Figure 10:
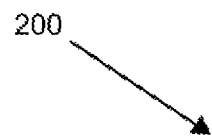
FIG. 10 shows the device of FIG. 2.
Figure 10:
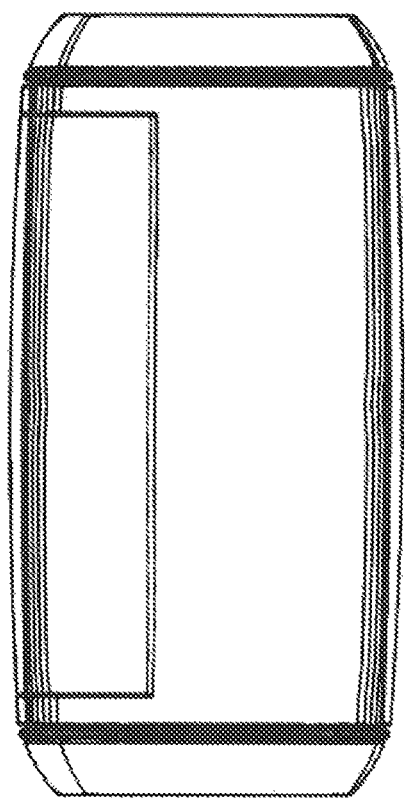
Figure 11:
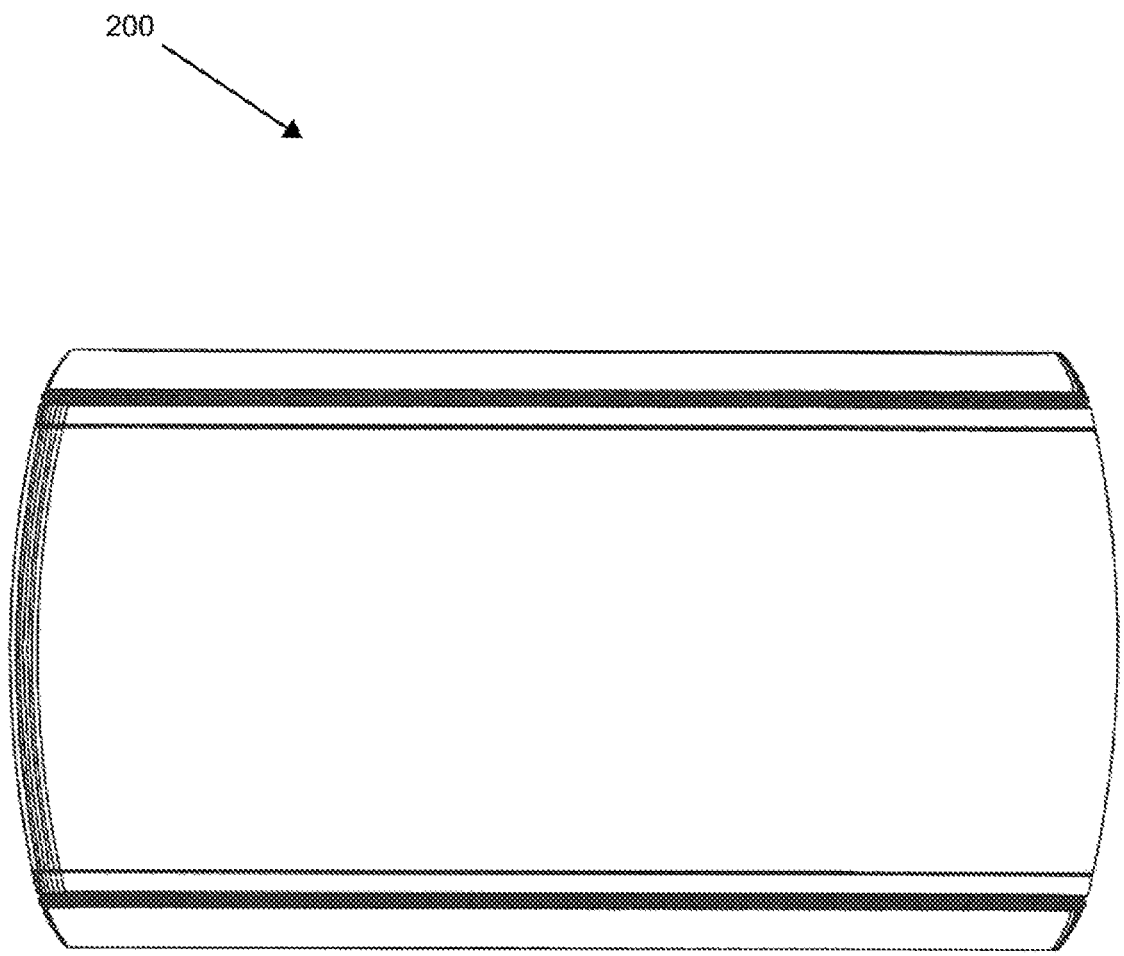
FIG. 11 shows the device of FIG. 2.
Figure 12:
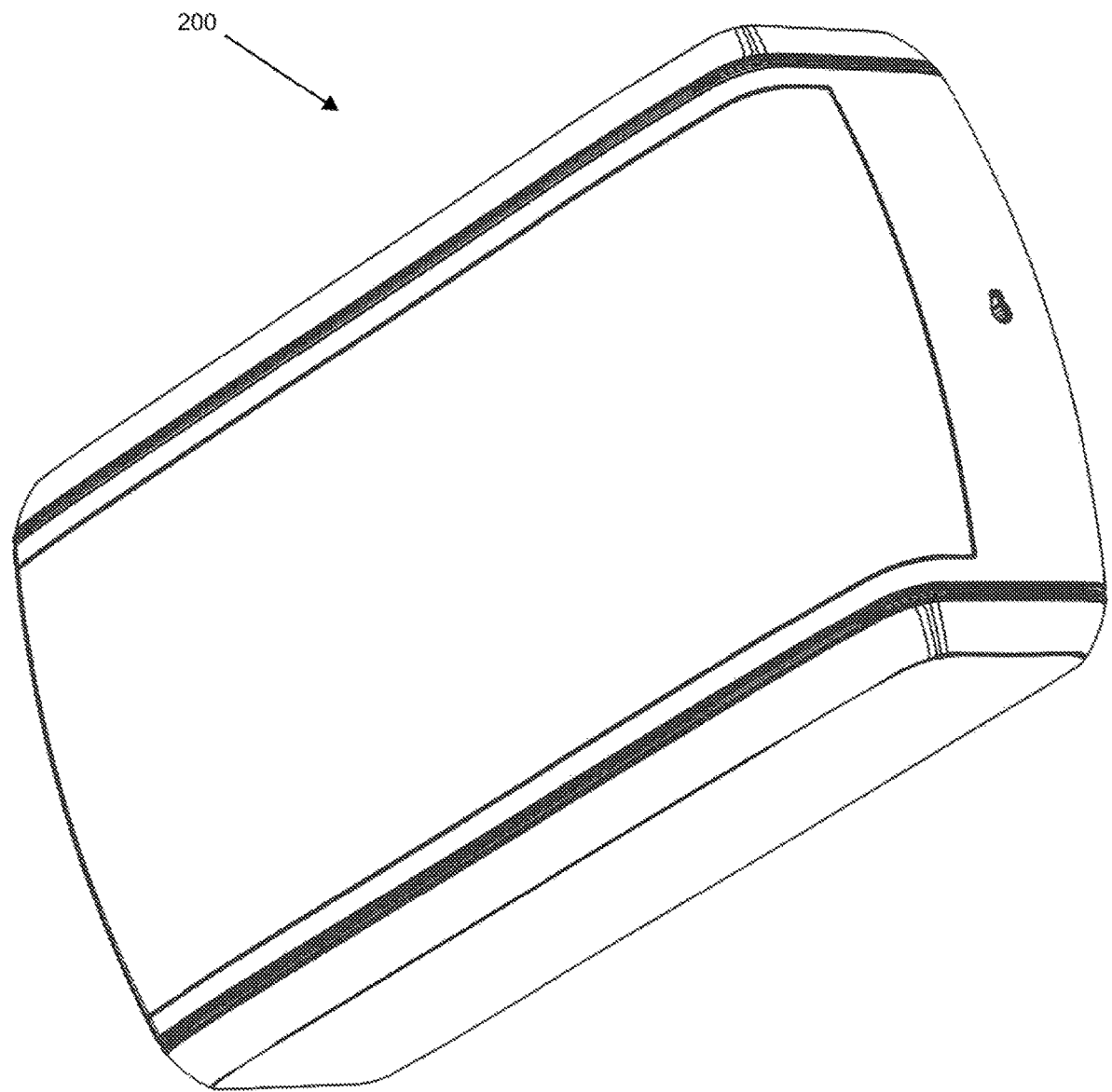
FIG. 12 shows the device of FIG. 2.
Figure 13:
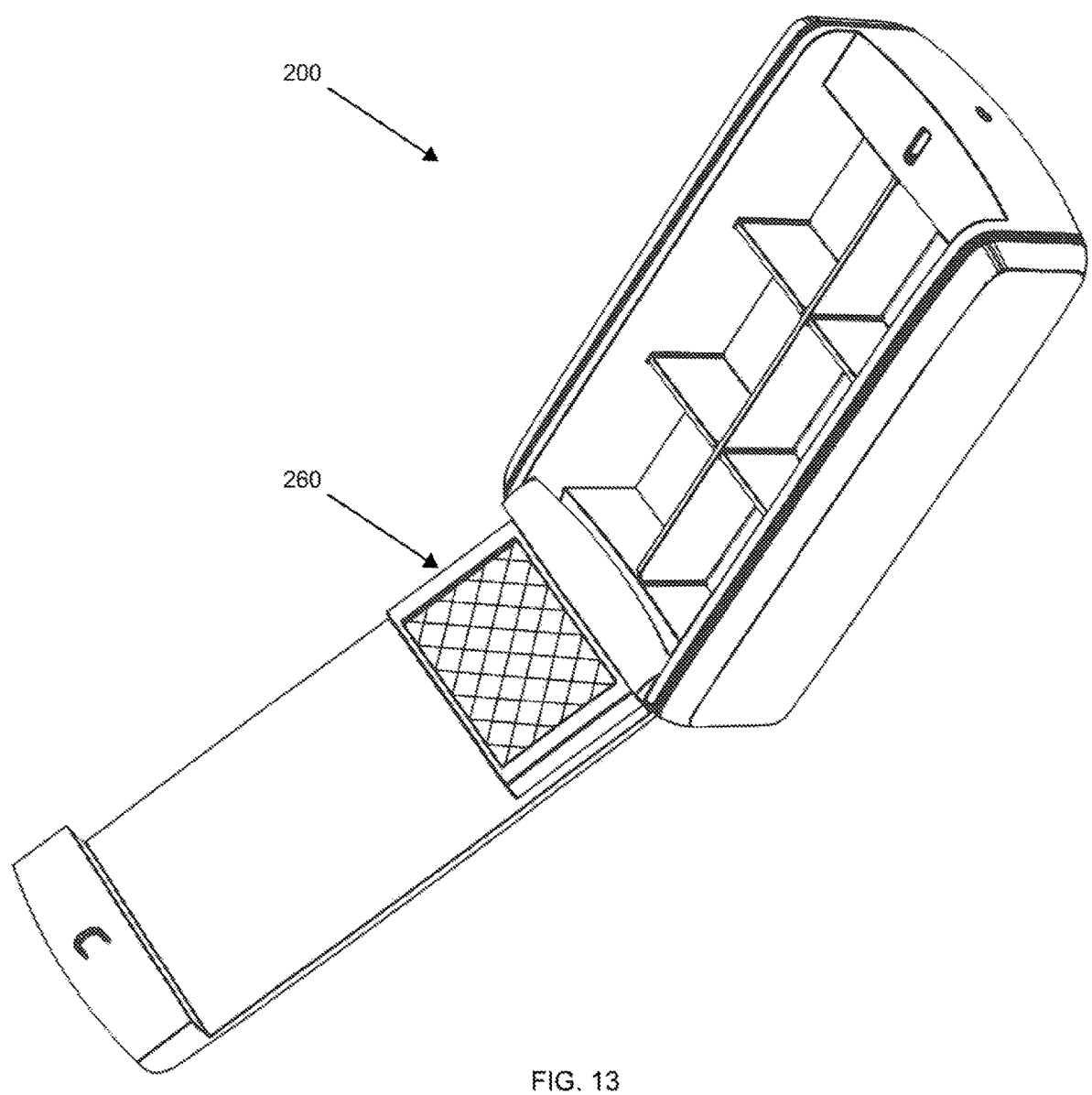
FIG. 13 shows the device of FIG. 2.

This patent application claims priority from U.S. Provisional Patent Application No. 62/635,835, filed Feb. 27, 2018, the disclosure of which is incorporated by reference herein in its entirety.

The present invention provides a secure storage, management and delivery device for a composition paired with a digital technology. The digital technology enables the user to unlock the device by pairing a software application installable on an IOS, Android and/or other platform with the device. The device includes an electro-mechanical lock for unlocking the device via an electronic chip paired with the software application. The Bluetooth and/or RFID chip can be non-removable from the device. The device can be activated with the software application installed on the paired digital technology including, for non-limiting examples, a computer, tablet, cellular smart phone, smart TV or other platform. The device may be battery powered, capable of operating on a wired power supply (such as a wall outlet, a USB charging cord, etc.) and/or capable of recharging a battery supply using a wired power supply. The top surface of a case of the device can remain attached after opening the device.

In an alternative embodiment, the Bluetooth and/or RFID chip may be provided in one or more intergraded chips. When embodied in multiple chips, one or more of the chips may be not-removable.

The device can have an environmental component for controlling environmental effects such as odor or moisture emanating from the device when the device is closed. In non-limiting examples, the environmental control component includes at least one single, double, triple, or other multiple edged bevel on a surface of the case of the device to create a substantially air tight seal when the case of the device is closed. Alternatively, or in addition, the environmental control component includes an absorbent material for absorbing environmental effects such as moisture and/or odor emanating from the device. The absorbent material can be contained in a sleeve or envelope. The absorbent environmental control component can be reversibly inserted within or attached to an exterior surface of the device. The absorbent material of the absorbent environmental control component can be removed and/or replaced as necessary.

The case of the device can have a mechanical override for unlocking the device without the paired digital technology. The device can be composed of a durable material such as, as non-limiting examples, a carbon infused plastic, aluminum, plastic coated metal, etc.

The case of the device can have a camera on the inside placed in order to view the contents of the inside of the device and/or have a rear facing to see who is accessing the contents of the device and case. A single camera (with or without a light) may be provided in the lid so as to view the contents when closed and to view who is accessing the device when the lid is opened.

The software application allows the user to pair an electronic digital technology or device, such as, for non-limiting examples, a computer, tablet, cellular or smart phone, smart TV or other platform with the device through a wireless technology that can reversibly lock the device. In one embodiment, the wireless technology can include Bluetooth, Wi-Fi, near-field communication (NFC), RFID, geo-tracking and other similar technologies. In another embodiment, the electronic technology can include a chip(s) disposed within and/or on the device for communication with the paired technology disposed at a remote distance from the device. The device may be manufactured with a hand-held, substantially mobile or portable sized case. Alternatively, the device can include a comparatively larger case for substantially stationary storage within, for example, a home environment. The storage device may be considered an internet of things (IoT) enabled device with smart functions that allow it to function with other such enabled devices, such as a home Wi-Fi router, alarm systems, laptops, tablets, virtual assistants (Alexa, Siri, Google Assistant) and any artificial technology enabled devices or systems, etc.

The device and paired digital technology can provide an application that appears on a technological device such as for non-limiting examples, a computer, tablet, cellular or smartphone, smart TV or other platform and can be operated by pressing the app button and opening to a screen with user friendly features:

In a non-limiting embodiment of the storage system pairing with digital technology with an application ('app'), and through Bluetooth, WiFi, and/or other technology, that appears on the technological device such as, but not limited to, a computer, tablet, cellular or smartphone, smart TV or other platform. It can be operated by pressing the app icon that opens to a screen with user friendly features, including, but not limited to static or stagnant features of the app including but not limited to battery life, connectivity, alarm, push alerts, digital fencing, e-commerce, help, resources. Icons at the bottom of each app screen can allow access into these different screens and areas of the application. The app may provide the following features:

1. Initial security access:
   a. Pressing the application ("app") icon opens to a Security screen
   b. The Security screen can have a background of an image watermark with a space to enter a PIN or biometric imprint to access the application.
   c. The Create Account link for first time and/or returning users can lead to the register and sign-up screen for the user to create an account with the app. The user can enter information to become part of the app or other integrators such as Facebook and Google; first time users can allow for push notifications and access to the Register Device screen.
2. Home Screen: Upon successful entering of the pin or biometric, the user can be brought to the Home screen.
   a. The Home screen can have a background of an image watermark with a photo of the user (as the user assigns) at the top, a Slide to Unlock (Device) function running from one side of the app screen to the other, with an identification of the current device (with or without photo) and link to switch device;
   b. The link to switch the device can bring to the My Device screen;
   c. Below the foregoing top features, the Home screen can further have icons for the user to click for toggling and bringing the user to other screens of the app. These screens can include, but not limited to the following screens: My Device, My Personal Wellness, Favorites, Settings, Shopping List, View Inside, Games, Resources, and Store;
   d. Clicking on My Device screen icon brings you to a screen with a background of an image watermark and icons to Register Devices which an account holder and to whom user can register devices, a icon for Managing Users which would bring a screen that has selecting users to specific devices, a icon for setting up geo-tracking and digital/electronic fences, a Find My Device icon which allows for tracking the digital device(s) of user (including lines 23-24 on page 3), a icon for sharing device(s) which brings to a screen allowing to share a device with another person for a limited time or forever, a icon for history which details all information regarding the device(s) being opened/closed, a icon to add photos of devices and an album;
   e. Clicking on My Personal Wellness screen icon brings you to a screen with a background of an image watermark and icons for community message board where users can chat with other users and likeminded individuals, an icon for consumption tracking, an icon detailing the contents of the device, an icon to journal or log health and wellness activities;
   f. Clicking on Favorites screen brings you to a screen with a background of an image watermark and a log and listing function for favorites as well as photo album and area along with camera link to take and store pictures of favorite items being stored in the digital device(s);
   g. Clicking on Settings screen brings you to a screen with a background of an image watermark and real time displays of the battery life of the linked digital device(s), the life and quality of the moisture control/packets and if replacement is necessary, temperature readings (if any), a log icon which brings to another screen that details the log of opening and locking of the connected digital device(s);
   h. Clicking on Shopping List screen brings you to a screen with a background of an image watermark and a listing screen where you can list the items to purchase (for storage in the device) and also has a note icon for specific non-shopping list exclusive notes (e.g. check on price for X);
   i. Clicking on View Inside screen brings you to a screen with a live view of the inside of the digital device handheld or table/larger and the ability to switch views of different devices (if the consumer has more than one device);
   j. Clicking on the Games screen brings you to a screen with a background of an image watermark that has entertainment applications and/or activity icons including but not limited to video games, trivia, and/or journey games. The games can open in specific games for the consumer to play, receive awards and buy points and aspects of the games and for products in the store;
   k. Clicking on Resources screen brings you to a screen with a background of an image watermark and links and/or icons to integrated companies chosen by the user to create an account and/or adding them in this screen from a Google search or other drop-down menu or other needs. This could include but is not limited to local businesses, community message boards, and push alert notifications regarding industry regulations and/or other information of interest for the user. The user can create a personalized icon to access information from these resources and integrate it directly to the icon;
   l. Clicking on Store screen brings you to a screen with a background of an image watermark and product icons and a cart that allows for the purchase of digital storage devices, accessories, e-coupons and access to gaming points, and links to third party vendors (by way of advertising or mutually beneficial relationships);

m. At the bottom of all screens is a Help link as well as Store link (with the exception of the Home screen as that has a store icon). Clicking the Help link can bring the user to a Help screen that has a FAQ icon, contact information and ability to call, email and/or chat.

In a non-limiting embodiment of the device pairing with the application ('app'), that appears on the technological device such as, but not limited to, a computer, tablet, cellular or smartphone, smart TV or other platform, it can include more detailed aspects of the foregoing app features including, full composition consumption tracker including detailed logs and integration with shopping lists;

push alert(s) for medical or other usage or refilling requirements for the composition, app updates, new legal information regarding stored materials, gamification and game aspects of the app, new features, new products, alerts regarding sharing and unlocking case, and more access to, entry, updating, and/or management of information, including updates, regarding (a) governmental, such as federal, state or local, and/or other industry regulations, (b) other news related to, for a non-limiting example, the stored composition and/or (c) other information of interest to the use of the device;

management component(s) for management of more than one device at home and portable;

community message board integration for those who use the app, use the device(s), and those in the industries and/or use products and items being stored;

component(s) for wellness or other health planning for the user of the device, including, but not limited to, integration with health apps on platforms and/or specific health applications to track other aspects of wellness including exercise, food intake, and stored items;

component(s) for an awards program for the user based on consumption tracking, games, usage of the device, usage of the app, loyalty to company and brands, etc.

component(s) for access to, entry and/or modification of other information of interest to the user, such as, for non-limiting examples, entertainment application(s) such as active and/or interactive video games, trivia games, journey games, and the like; web site(s) of interest to the user; names and addresses of local dispensaries of the composition; community message board(s), and on-line or other store promotion(s);

locating component(s) for locating the device such as, for a non-limiting example, a tracking chip such as a GPS/WI-FI tracking chip, RFID;

full integration with virtual assistants through the app, including Alexa, Siri, Google assistant and any current and/or future artificial technology that will assist in using the app, connecting the app to the device and/or case, opening and/or unlocking the device and/or case, taking pictures with the device and/or case and/or app, and otherwise using any features of the app, the device and/or case at any stage of development, design, iteration and/or updates;

component(s) for interactive profile and/or goal achievement such that a user may record, monitor and/or revise as necessary alerts, experience, and other information regarding consumption of the composition and related health and/or wellness effects on the user; and full camera integration capabilities for those opening/unlocking the device, using the app, the contents of the device as well as pictures of favorites, pictures of user, pictures of those sharing devices, pictures of shopping items, pictures for games, and any other use of camera through the app and as installed in and/or part of the device.

In one embodiment, the consumption tracker can be configured to operate analogously to, for a non-limiting example, a hotel-mini bar. Consumption can be tracked based on periodic removal of the composition from the device. The consumption can be detected by one or more sensors disposed on an interior and/or exterior surface of the device or may be logged manually be the user. The sensor(s) can be electronically connected to a digital controller for tracking or reporting, and management of consumption, as desired. The digital controller can be disposed within the device or within the paired management tool such as for non-limiting examples, a smart phone, tablet and/or computer.

The community message board can include an interactive messaging component for exchange of information such as, for non-limiting examples, advice and/or recommendation regarding composition consumption for a particular purpose, such as, again, for a non-limiting example, back pain and/or headaches. The message board can also be to discuss digital device updates, needs, and app needs and updates as well as a community forum for favorites, wellness, tracking, etc.

In a further, non-limiting embodiment, the operation of the storage device may include a determination of a geographical location of the storage device, such as by consulting a locating component. The digital controller may then alert the user to any local regulation or laws regarding the use of composition stored within the storage device. Such alerts may be provided the first time the storage device is used within a given geographic area, such as a State, and/or the alerts may be provided periodically, such as once a week, month, etc. The alerts may also be provided whenever additional composition is added to the storage device.

Geographical location may also be used for digital fencing, for example, to provide alerts when the storage device is moved outside of a limited area.

In another, non-limiting embodiment, the storage device or digital controller may include a scanning component, such as camera or RFID reader. Data may then be read from packaging associated with the composition, such as by reading a UPC code, in order to automatically update information detailing the contents of the storage device, for example, the packaging may provide sufficient information to determine the quantity of the composition.

In different embodiments, the device can include odor proof or other component(s) for reducing and/or substantially eliminating odors emanating from the device caused by the composition contained therein.

In different embodiments, the device can include waterproofing, water-resistant features or other component(s) to protect against water damage.

In different embodiments, the device can include a camera inside and/or outside that, without limitation, may have internal, front facing or rear facing lenses, showing the contents of the device and/or case, the users of the device and/or case, the outside of the device and/or case and those that are opening and unlocking the device and/or case as well as those using the app.

In different embodiments, the device can include drop proof or other shock absorbent component(s) to protect against damage such as physical damage resulting from, for non-limiting examples, dropping, throwing and/or banging of the device against an external surface. The shock absorbent component includes a case for the device having one or more panels each including a double walled construction. Alternatively, or in addition, the shock absorbent component includes at least one single, double, triple, or other multiple beveled edge on a surface of the case of the device adapted for absorbing a shock or other damage or trauma to the device. The beveled edge can also provide an environmental effect control, as discussed above.

In different embodiments, the device can include component(s) for modification and/or customization of storage, consumption and/or use of a composition contained therein. In one embodiment, the component is a compartmentalization component specific to the composition and desired method of its use. The compartmentalization component can be fixed internally inside the device. Alternatively, the compartmentalization component can be reversibly inserted into the device.

The interior compartment of the storage device may be customized with various inserts. The inserts allow the user to vary the size of the various subsections which can be used for various consumables, e.g., vape canisters, tinctures, pills, small bottles, etc. The inserts may be sized to accommodate such varying consumption methods and/or those contents being stored in the device so as to have them placed more comfortably and not rolling around as much or just placed in the device and/or case. Additional inserts may include subcomponents configured to securely store such consumables. In some embodiments, the storage device may be able to determine the number of consumable containers held within the insert and provide updates to a paired device regarding the inventory of the storage device (e.g., when the inventory is below a given threshold).

In different embodiments, the consumables can include a composition including a component selected from the group consisting of a liquid, a solid, a flower, a wax, oil, an edible composition, and a composition adapted for vaporizing or vaping.

In different embodiment, the composition can include a component dissolved in a solvent. In one embodiment, the solvent is an alcohol. In another embodiment, the composition includes a component dissolved in a solvent to form a tincture.

In different embodiments, the device can include an accessory component which can be reversibly inserted or stored within the device including, for non-limiting examples, a syringe, a vaporizing device such as, for a non-limiting example, a vaping pen, a paper product, a lighter, a grinder, and a composition container.

The device can be provided in various designs of color and style selected according to a user or manufacturer's preference.

In different embodiments, the device can include a reversibly installable or mountable exterior sleeve or skin adapted for reversibly holding, securing and/or storing item(s) such as for non-limiting examples, credit card(s), license and/or other identification card(s), cash, and the like.

The device can include a charger such as a fast charger, with one or more different adapters.

In one non-limiting embodiment, the system can include an emergency/panic feature. Such features may include alerts from the storage device to any (or all) connect paired device (e.g., a push alert), an audible alert from the storage device itself, activation of a camera (for example, to take a photo of anyone attempting to access the device and to transmit that photo to a paired device), activation of additional locks, etc. Such an alert may be triggered by movement of the storage device without a paired device in proximity, removal of the storage device from a limited geographical area (geo-tracking), forced opening of the storage device, etc.

Push alerts and notifications may be opted in during registering and/or at other times when prompted by the app. These alerts can prompt users to take actions. These alerts can tell users when the case has been opened or closed, if the battery and/or moisture/temperature is low and/or packets or moisture/temperature control items and mechanism need to be replaced and/or updated, regarding updates, regarding sales, to remind about consumption tracking (e.g., "did you use your digital device contents today"), to add to favorites or when running low on contents, geo-tracking and digital fencing (e.g., case is out of range where you set it up), if the case is opened by another (e.g., through sharing), if case is open or closed at all, etc.

In different embodiments, the system may also provide logging of various events. The storage device may be configured to detect potential tamper events, for example based on movement of the device, opening of the storage device, etc. Such events may then trigger alerts to the paired devices and/or logged. The logged information may include details such time, date, duration, etc. If the storage device also includes a camera (or has access to a camera in its proximity via another IoT device) then an image or video of the attempt may also including in the log entry.

In one non-limiting embodiment, the device is of a size substantially comparable to a cell phone. In another non-limiting embodiment, the device has dimensions in a range of 6 by 3 by 1.5 inches. In a further non-limiting embodiment, the device is considerably larger than a standard cell phone, for example, when the device is designed to be stationary.

In one embodiment, the system provides speech recognition features. The storage device, a paired device and/or an IoT device may include a speaker capable of detecting a user's spoken command. The spoken command can be interpreted by the device or transmitted to another device for interpretation (e.g., to a cloud-based server). Once the spoken command is interpreted the relevant instruction may be set to the associated device, for example, if the command is to "open the storage device", the "storage device" received the open instruction. Additional features may be included based on the user's voice, for example, user identification, password verification, etc. The speech recognition features may also use artificial intelligence, for example, similar to Alexa, Siri and Google Assistant. This artificial intelligence may be used for various purposes, such as speech recognition and/or generating recommendations for the user (such as by highlighting features that may be of interest based on usage statistics).

FIG. 1 shows a block diagram of a system 100 that is suitable for use in practicing various embodiments. In the system 100 of FIG. 1, the storage device 110 includes a lock 113, a controller, such as a data processor (DP) 112 and a computer-readable medium embodied as a memory (MEM) 114 that stores computer instructions, such as a program (PROG) 115. Storage device 110 may communicate with a paired device 120, for example, via the internet 130.

Paired device 120 includes a controller, such as a data processor (DP) 122 and a computer-readable medium embodied as a memory (MEM) 124 that stores computer instructions, such as a program (PROG) 125. Both storage device 110 and/or paired device 120 may communicate with each other, for example, via the internet, and/or via direct communications channels (such as a wireless connection or a physical connection).

The programs 115, 125 may include program instructions that, when executed by the DP 112, 122, enable the storage device 110 and/or paired device 120 to operate in accordance with an embodiment. That is, various embodiments may be carried out at least in part by computer software executable by the DP 112 of the storage device 110, the DP 122 of the paired device 120, by hardware, or by a combination of software and hardware.

In general, various embodiments of the paired device 120 may include tablets and computers, as well as other devices that incorporate combinations of such functions.

The MEM 114, 124 may be of any type suitable to the local technical environment and may be implemented using any suitable data storage technology, such as magnetic memory devices, semiconductor based memory devices, flash memory, optical memory devices, fixed memory and removable memory. The DP 112, 122 may be of any type suitable to the local technical environment, and may include general purpose computers, special purpose computers, microprocessors and multicore processors, as non-limiting examples.

Figure 14:
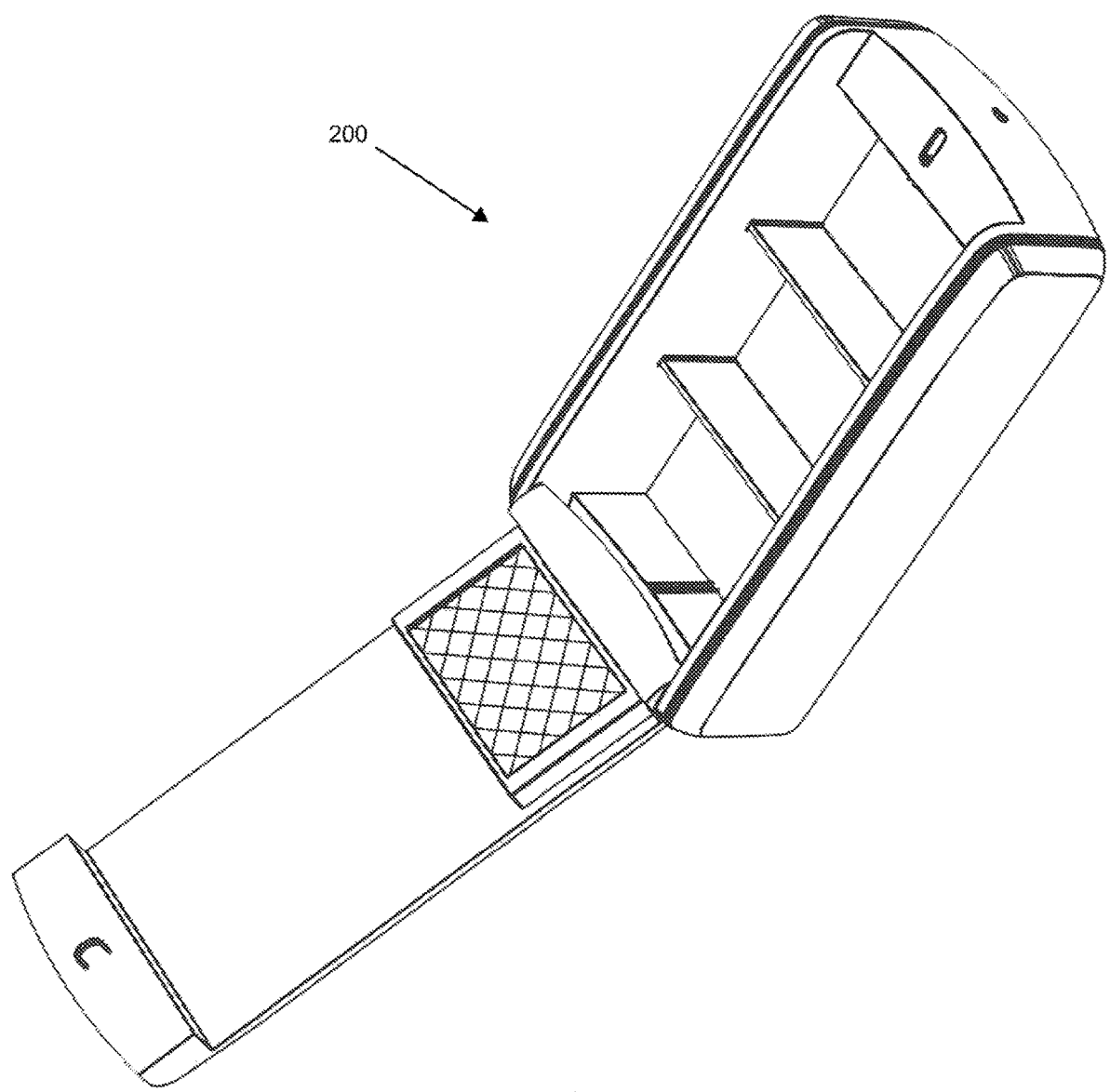
FIG. 14 shows the device of FIG. 2.
Figure 15:
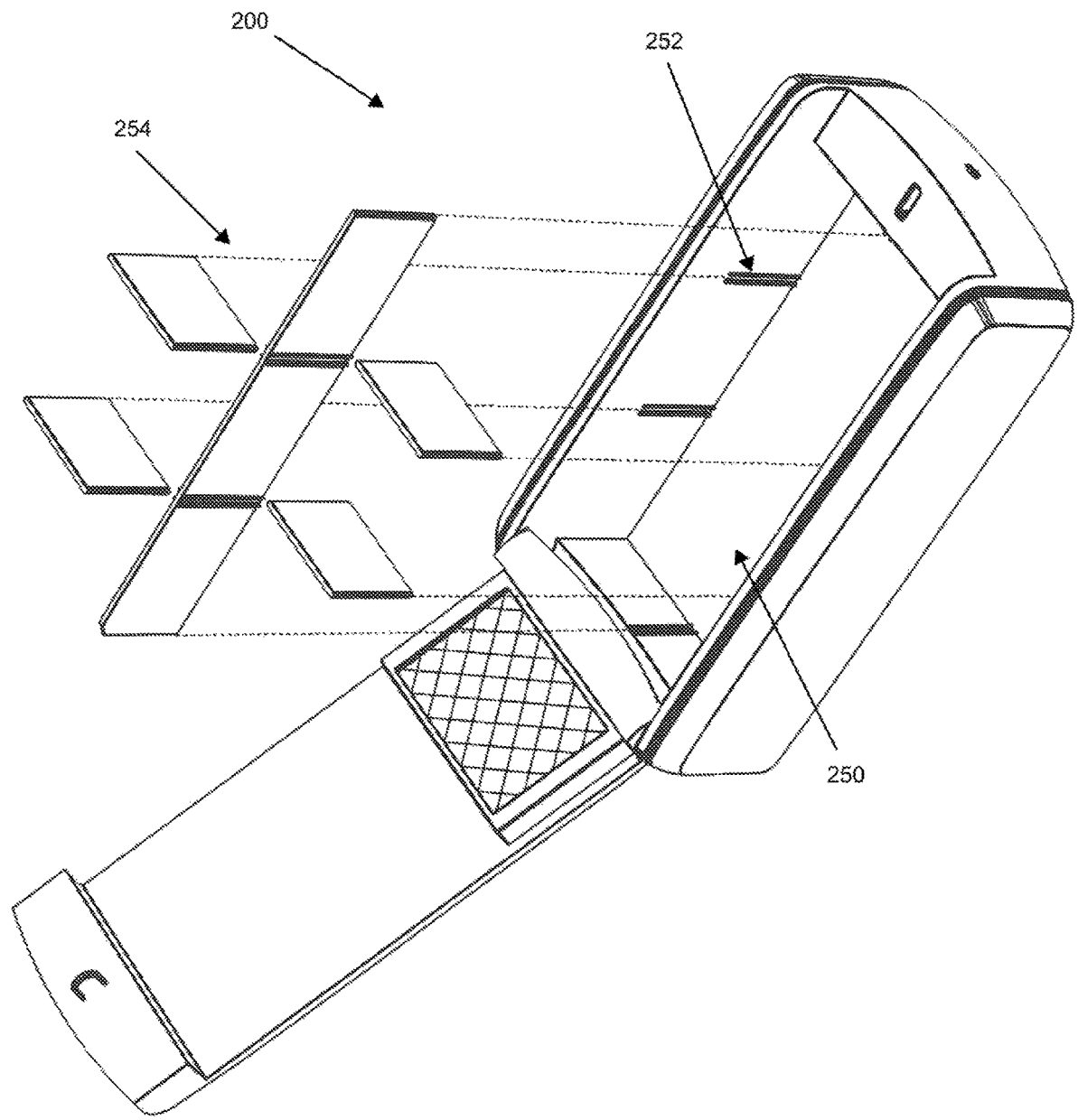
FIG. 15 shows the device of FIG. 2.

FIGS. 2-15 show a storage device 200 according to an embodiment. As shown, the storage device 200 includes a body 210 with a large lid 220. The exterior body 210 includes a charging connection point 230 and a mechanical unlocking opening 240 (shown as a keyhole). The interior cavity 250 includes various insert securing points 252 which are configured to hold inserts 254 so as to divide the interior 250 into sub-compartments. A sub-set of inserts 254 may be used in various combinations so as to allow the user to customize the dimensions of the sub-compartments (as shown in FIG. 14). The inside of the lid 220 also include an environmental controlling insert holder 260 which can be used to hold various environmental controlling elements, such as a water-absorbent patch.

Figure 16:
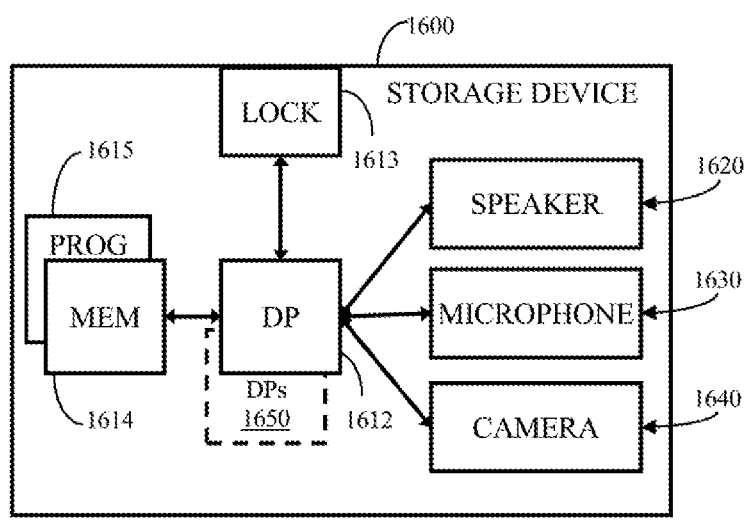
FIG. 16 illustrates a storage device according to another embodiment.

FIG. 16 shows a block diagram of a storage device 1600 that is suitable for use in practicing various embodiments. The storage device 1600 includes a lock 1613, a controller, such as a data processor (DP) 1612 and a computer-readable medium embodied as a memory (MEM) 1614 that stores computer instructions, such as a program (PROG) 1615. Storage device 1600 may communicate with another device such as a paired device, web-based server, etc., for example, via the internet.

The storage device 1600 also includes a speaker 1620, a microphone 1630 and a camera 1640. The speaker 1620 and microphone 1630 may be configured to provide a voice assistant feature, for example, by capturing voice commands on the microphone 1630 and playing responses on the speaker 1620. The camera 1640 may be used to capture images of the user and/or to capture images of the interior of the storage device 1600 (e.g., for transmission to a paired device). The speaker 1620, microphone 1630 and camera 1640 may be provided as a single element or as multiple subcomponents, for example, the speaker 1620 may include an exterior speaker suitable for playing alerts and an interior speaker suitable for playing generated audio responses.

The storage device 1600 may also include various special purpose DPs 1650. The DPs may provide dedicated functions, such as RFID, voice recognition, location determination, etc. These features may be provided by a single DP 1650 or multiple DPs 1650. The DPs 1650 may be individually removable or individually secured to the storage device 1600. The DPs 1650 may be embedded within the substructure of the storage device 1600 and/or may be hidden or otherwise inaccessible.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:
1. A storage system comprising:
  a housing including an access panel, the housing sized and configured to be handheld and defining a sealed-cavity, the access panel configured to open and close to control access to the sealed-cavity; and
  an electro-mechanical lock configured to lock and unlock the access panel; and
  a digital controller included in the housing and coupled to the electromechanical lock, the digital controller configured to wirelessly receive information employed by the digital controller to control an operation of the electro-mechanical lock,
  wherein the access panel comprises an environmental control component adapted to minimize an environmental effect when the access panel is closed.

2. The storage system of claim 1, wherein the environmental control component is adapted to minimize the environmental effect including moisture entry into the device.

3. The storage system of claim 1, wherein the environmental control component is adapted to minimize the environmental effect including an odor emanating from the device.

4. The storage system of claim 1, wherein the environmental control component is adapted to absorb the environmental effect including a shock.

5. The storage system of claim 1, further comprising a shock absorbent component.

6. The storage system of claim 1, further comprising a microphone included in the housing and coupled to the digital controller, the digital controller configured to receive a voice signal, wherein the digital controller is configured to interpret the voice signal to determine an associated instruction and to perform the associated instruction.

7. The storage system of claim 6, wherein the associated instruction is one of: open the access panel; close the access panel; lock the electro-mechanical lock; and unlock the electro-mechanical lock.

8. The storage system of claim 1, further comprising a microphone included in the housing and coupled to the digital controller, the microphone configured to receive a voice signal employed by the digital controller to control the operation of the electro-mechanical lock.

9. The storage system of claim 1, further comprising a camera included in the housing and coupled to the digital controller, the camera configured to capture images of access and closure events.

10. The storage system of claim 1, further comprising a geo-location device configured to provide the digital controller with information concerning a current geographic location of the storage system.

11. The storage system of claim 10, wherein the digital controller is configured to generate an alert with information concerning an item currently stored in the sealed cavity in response to an initial-access to the sealed cavity in a known geographic area.

12. The storage system of claim 11, wherein the information includes legal information with government regulations concerning the item.

13. The storage system of claim 1, wherein the electro-mechanical lock includes a manual override configured to allow a user to unlock the lock and operate the access panel to access the sealed-cavity.

14. A storage system comprising:
a housing sized and configured to be handheld and including an access panel, the housing including an exterior surface with a plurality of beveled edges, the housing defining an airtight cavity with the access panel locked in a closed position;
an electro-mechanical lock configured to lock and unlock the access panel; and
an electronic system included in the housing, the electronic system including a wireless communication system and a GPS, the electronic system configured to switch the electro-mechanical lock between a locked state and an unlocked state based on information received from at least one of the wireless communication system and the GPS,
wherein the electronic system is configured to generate an alert with information concerning an item currently stored in the airtight cavity in response to an initial-access to the airtight cavity in a geographic area identified with information provided by the GPS.

15. The storage system of claim 14, wherein the information includes legal information with government regulations concerning the item.

16. The storage system of claim 14, wherein the item includes a composition, and
wherein the information includes names and addresses of local points-of-purchase for the composition.

17. The storage system of claim 14, wherein the electronic system includes a voice recognition system configured to detect a user's spoken command, and
wherein the electronic system is configured to change a state of the electro-mechanical lock based on information included in the spoken command.

18. The storage system of claim 17, wherein the spoken command includes at least one of lock the electro-mechanical lock and unlock the electro-mechanical lock.

19. The storage system of claim 14, wherein the housing is sized and configured to be pocket-sized.

* * * * *